United States Patent
Yanagisawa (12)
(10) Patent No.: US 6,236,532 B1
(45) Date of Patent: May 22, 2001

(54) MAGNETIC DISK DRIVE HAVING SMALL CLEARANCE BETWEEN MAGNETIC DISK AND SURFACE OPPOSING THERETO

(75) Inventor: Masahiro Yanagisawa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,427

(22) Filed: Sep. 26, 1997

Related U.S. Application Data (63) Continuation of application No. 08/514,606, filed on Aug. 14, 1995, now abandoned.

(30) Foreign Application Priority Data

Aug. 16, 1994 (JP) .................................................. 6-192355
Feb. 24, 1995 (JP) .................................................. 7-036665

(51) Int. Cl.$^7$ ................................................ G11B 33/14
(52) U.S. Cl. ................................. 360/97.02; 360/97.03; 360/98.01
(58) Field of Search ........................... 360/97.02, 97.03, 360/97.04, 102, 97.01, 98.01

(56) References Cited

U.S. PATENT DOCUMENTS

| | | | | |
|---|---|---|---|---|
| 5,280,403 | * | 1/1994 | Martin | 360/97.01 X |
| 5,325,251 | * | 6/1994 | Gorove et al. | 360/97.02 X |
| 5,381,284 | * | 1/1995 | Gregory et al. | 360/97.02 |
| 5,422,770 | * | 6/1995 | Alt | 360/105 |
| 5,453,890 | * | 9/1995 | Takegami et al. | 360/97.02 |
| 5,675,452 | * | 10/1997 | Nigam | 360/97.02 |
| 5,850,317 | * | 12/1998 | Gregory et al. | 360/97.01 |

FOREIGN PATENT DOCUMENTS

| | | |
|---|---|---|
| 61-9818 | 1/1986 | (JP) . |
| 62-185287 | 8/1987 | (JP) . |
| 3-32882 | * 2/1991 | (JP) . |
| WO 94/11877 | * 5/1994 | (WO) . |

* cited by examiner

Primary Examiner—William R. Korzuch
(74) Attorney, Agent, or Firm—Hayes, Soloway, Hennessey, Grossman & Hage, PC

(57) ABSTRACT

A magnetic disk drive is provided having at least one magnetic disk, a magnetic head for writing and reading data, and a vessel in which the magnetic disk and magnetic head are sealed. The vessel is filled with air, an inert gas, or a mixture of air and inert gas. A clearance distance is provided between the magnetic disk and a surface opposite thereto, which distance is not larger than 1.0 mm when the vessel is filled with air, 1.1 mm with helium, 1.7 mm with neon, 1.2 mm with argon, 1.4 mm with krypton, and 1.2 mm with xenon. In one preferred embodiment, there may be provided a plurality of grooves on the stationary surface opposite to the magnetic disk, or a fan in a rotary shaft of the magnetic disk, in order to direct air inwardly between the magnetic disk and the surface opposite thereto. By setting the clearance distance as small as possible, it is possible to reduce the thickness reduction of lubricant caused by shearing force of air flow along the magnetic disk surface. Also, by appropriately selecting the gases to be used, and by using the groove or fan structures, the clearance distance may be further reduced.

7 Claims, 9 Drawing Sheets

MAGNETIC DISK DRIVE HAVING SMALL CLEARANCE BETWEEN MAGNETIC DISK AND SURFACE OPPOSING THERETO

This is a continuation of application Ser. No. 08/514,606 filed on Aug. 14, 1995 now abandoned.

BACKGROUND OF THE INVENTION (1) Field of the Invention

The present invention relates to magnetic disk drives, and more particularly to high storage density magnetic disk drives which are capable of increasing the reliability of magnetic disks.

(2) Description of the Related Art

In magnetic disk drives, usually at least one magnetic disk is used. To prevent wear of the magnetic disk due to friction with the magnetic head, the magnetic disk has its surface covered by a liquid lubricant, such as PFPE (perfluoropolyether).

However, the liquid lubricant has the problem that its thickness is reduced gradually due to scattering caused by centrifugal forces produced by rotation of the magnetic disk. The extent of the thickness reduction is accelerated by the shearing force of air flow or stream along the surface of the magnetic disk. As the thickness of the liquid lubricant becomes thinner, the lubrication is effect of preventing wear of the magnetic disk caused by friction thereof with the magnetic head is reduced thereby resulting in wear generation. This gives rise to frequent loss of data stored in the magnetic disk, thereby deteriorating the reliability of the system.

SUMMARY OF THE INVENTION

An object of the invention is to provide a magnetic disk drive, in which the influence of shearing force of air flow along the magnetic disk surface is minimized.

The magnetic disk drive according to the invention features a clearance between a magnetic disk and an opposed surface thereto, for instance between adjacent magnetic disks, between a magnetic disk and the inner top or bottom wall surface of a magnetic disk vessel, or between a magnetic disk and a plate disposed between adjacent magnetic disks, that is small enough to eliminate air flow along the magnetic disk surface. The clearance can be determined in terms of a millimeter unit by the following formula:

$$\sum_{n}^{n} t_n \times m_n$$

wherein $m_n$ is the mole percentage of gas n, and $t_n$ is the clearance coefficient of the gas n. The clearance coefficient varies with the sealed gas and is found to be 1.0 for air, 1.1 for helium, 1.7 for neon, 1.2 for argon, 1.4 for krypton, and 1.2 for xenon. As for the clearance between the magnetic disk and an opposed surface portion in which the magnetic head is operative on the surface of the magnetic disk, it may be such that the magnetic disk will not be touched by the magnetic head, that is, it may be slightly greater than the thickness of the magnetic head.

Another feature of the invention resides in that the surface of a plate which is disposed between a magnetic disk and the inner top or bottom wall surface of the magnetic disk drive or between adjacent magnetic disks, is formed with a groove having an inclination angle having a value larger than 0 degrees and not larger than 90 degrees in the direction of rotation of the disk with respect to the direction of the inner periphery of the disk.

Further, according to the invention, air flow directed inwardly of magnetic disk is produced between the disk and an opposed surface by means of a fan provided in a shaft, thereby minimizing scattering of liquid lubricant.

There have been several attempts at reducing the clearance between adjacent ones of two or more magnetic disks disposed one above another by making certain modifications in the magnetic head related to size reduction of the magnetic disk drive (as disclosed in, for instance, Japanese Patent Application Kokai Publication No. Sho 61-9818 and Japanese Patent Application Kokai Publication No. Sho 62-185287). However, no specific example of clearance value for clearance value from the standpoint of the scattering of lubricant is shown in the aforesaid prior art publications.

At the position of radius r of a magnetic disk, the shearing force $\tau o$ of air flow acting on the liquid lubricant surface in the radial direction of the air flow maybe given as:

$$\tau o = (\omega^{3/2} \rho v^{1/2} r)/2 \quad (1)$$

wherein $\omega$ is the angle of rotation speed, $v$ is the viscosity of air, and $\rho$ is the density of air.

The shearing force $\tau$ of air flow is expressed by the equation (2) given below with a slope with respect to distance Z of the direction of the axis of rotation of the velocity V of air stream flowing in the clearance between magnetic disk and an opposed surface (i.e., direction across the clearance). The shearing force $\tau$ for Z=0 (i.e., lubricant surface) corresponds to $\tau o$.

$$\tau = \partial V / \partial Z \quad (2)$$

Thus, when V is positive (i.e., directed outwardly from the magnetic disk), the shearing force $\tau$ causes scattering of liquid lubricant. If V becomes zero, the shearing force becomes zero, and thus the scattering of liquid lubricant can be minimized. When air flow is directed inwardly of the magnetic disk, V becomes negative, and the thickness reduction of the liquid lubricant film can be further reduced.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF THE PREFERRED EMBODIMENT

Now, preferred embodiments of the invention will be explained with reference to the drawings.

Figure 1A:
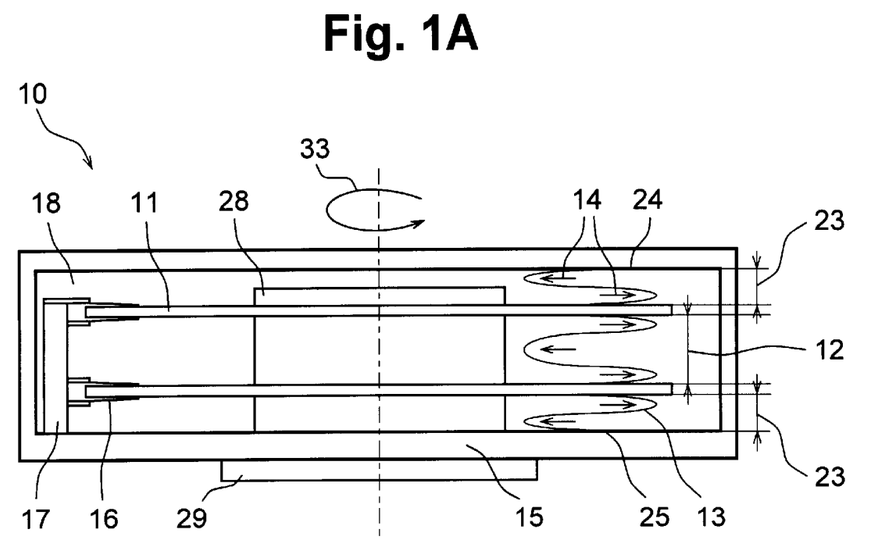
FIG. 1A is a schematic view showing a magnetic disk drive according to the invention.
Figure 2:
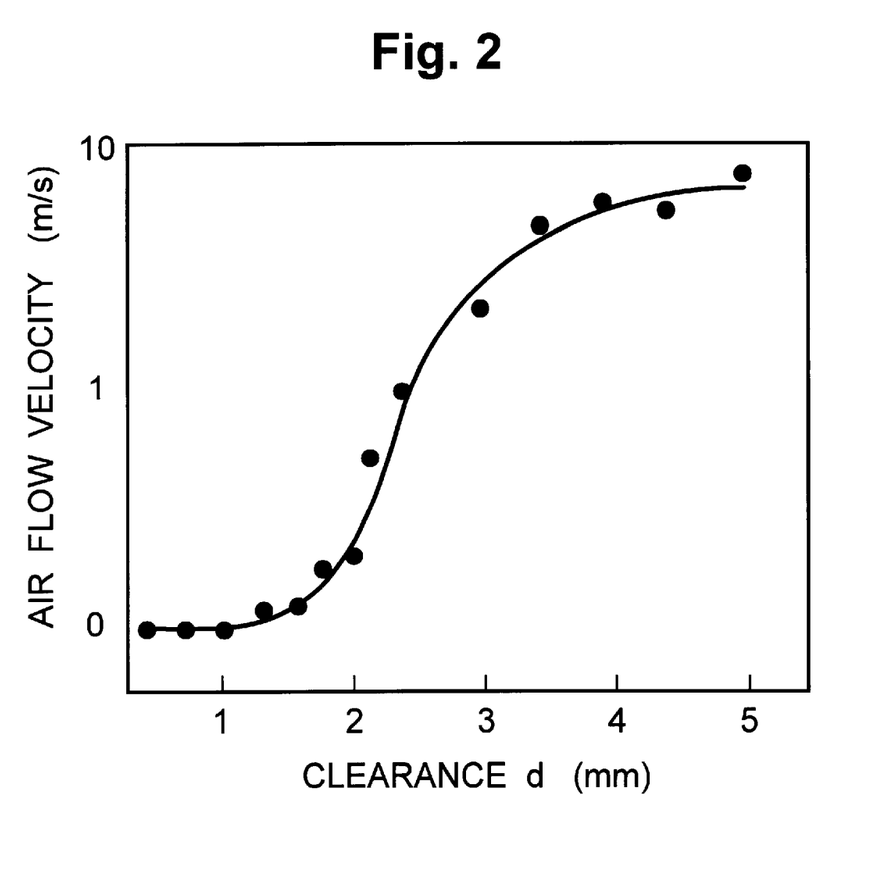
FIG. 2 is a graph showing the relation between radial direction air flow velocity along a lubricant surface and a clearance between a magnetic disk and an opposed surface.

As shown in FIG. 1A, air in the clearance between the rotating magnetic disk and an opposed surface thereto, for instance, between adjacent magnetic disks, between a magnetic disk and adjacent inner surface of the top wall of the magnetic disk vessel, or between a magnetic disk and an adjacent inner surface of the bottom wall of the vessel, flows radially outward in the vicinity of the surface of the magnetic disk 11, and inward in the neighborhood of the center between adjacent magnetic disks or along the top or bottom wall inner surface 24 or 25 of the vessel 15. The velocity distribution 13 of the air flow varies with the Reynolds number R of rotation. Denoting the clearance such as the clearance 12 between adjacent magnetic disks or the clearance 23 between the magnetic disk and the inner top or bottom wall surface of the vessel by d, the Reynolds number R is given as:

$$R = \omega d^2 / v \qquad (3)$$

where ω and v are constant, and the velocity V of air flow decreases the distance d, as shown in FIG. 2. FIG. 2 is a graph showing results of measurement of the air flow velocity using a laser Doppler flowmeter, the air flow velocity being plotted against the clearance. It will be seen from FIG. 2 that the air flow velocity is zero with clearances of 1 mm and below. While it was confirmed that the air flow velocity is zero with clearances up to 0.1 mm, since the air flow velocity is theoretically zero with zero clearance between adjacent magnetic disks, it is obvious that the air flow velocity is zero continuously in the clearance range between 0 and 0.1 mm. When the air flow velocity is made zero, the thickness reduction of the liquid lubricant becomes solely due to the influence of the fluidity of liquid the outer side of the magnetic disk due to centrifugal forces, and thus the thickness reduction can be minimized.

When gases other than air, with different values of the Reynolds number given by the above equation (3), were used, the clearance (i.e., maximum clearance) with which the gas flow velocity was zero varied as shown in Table 1. For example, when neon gas was used, the maximum clearance for zero gas flow velocity was increased by 1.7 times, thus increasing clearance redundancy when using a large head.

TABLE 1

| Kinds | Maximum Clearance (mm) |
|---|---|
| Air | 1.0 |
| Helium | 1.1 |
| Xenon | 1.2 |
| Argon | 1.2 |
| Krypton | 1.4 |
| Neon | 1.7 |

Gas which is more effective than air may be any gas higher in viscosity than air. In practice, the gases shown in Table 1 are suitable from the considerations of corrosion, toxicity and combustibility. These gases may be used alone or as mixtures. For example, with a mixture of gases obtained by mixing gases A and B with a mole mixing ratio $r_A$ of the gas A, the clearance d for zero gas flow velocity may be varied according to the mixing ratio as given by the following equations. Denoting the zero velocity clearances in the cases of the sole gases A and B by $d_A$ and $d_B$, respectively, $$r_A = M_A / (M_A + M_B) \qquad (4)$$

$$d_o = k(r_A v_A + (1 - r_A) v_B) \qquad (5)$$
$$= (r_A d_A^2 + (1 - r_A) d_B^2)^{1/2}$$

where $M_A$ and $M_B$ are mole numbers of the gases A and B, respectively, and k is a constant $((R/\omega)^{1/2})$.

Figure 3:
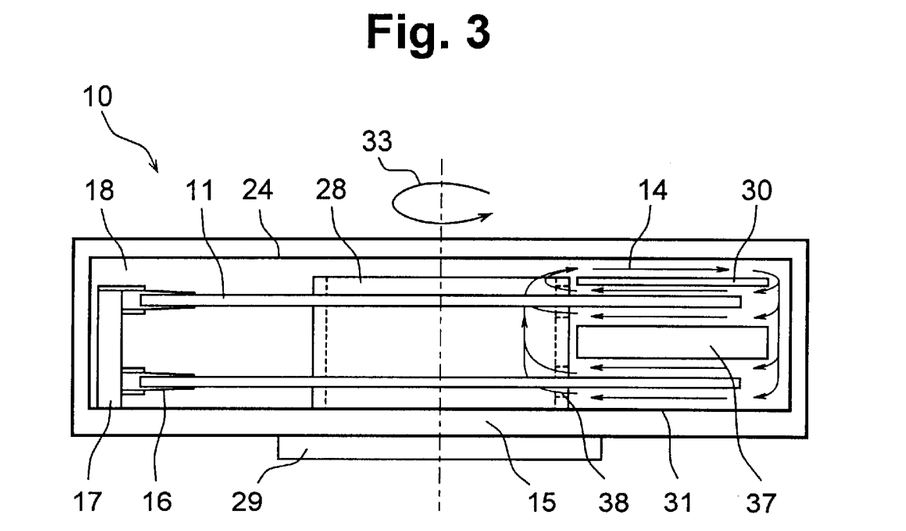
FIG. 3 is a schematic view showing a different magnetic disk drive according to the invention.
Figure 4:
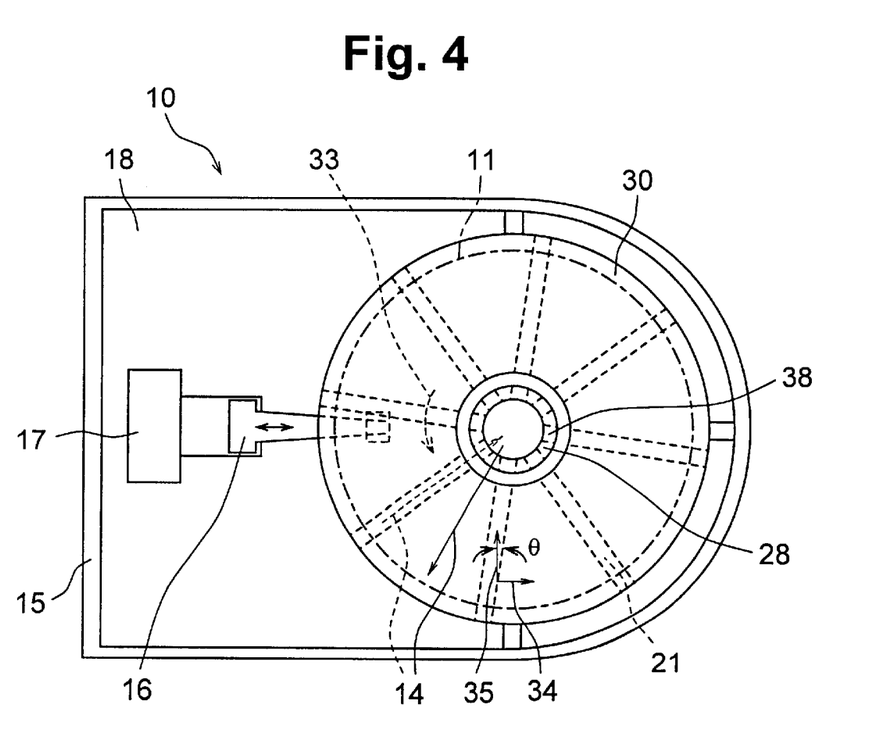
FIG. 4 is a schematic top view showing a further magnetic disk drive using a grooved plate with straight grooves according to the invention.
Figure 5:
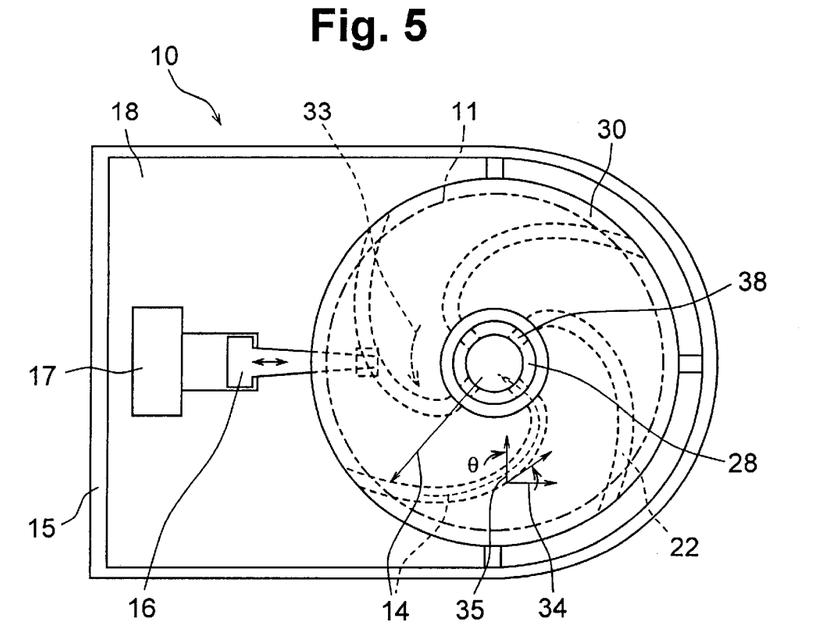
FIG. 5 is a schematic top view showing a further magnetic disk drive using a grooved plate with spiral grooves according to the invention.

As shown above, the outward air flow along the magnetic disk surface accelerates the thickness reduction of the liquid lubricant. However, by causing inward air flow it is possible to prevent the thickness reduction. One method to this end, as shown in FIG. 3, is to dispose a grooved plate 30 between the magnetic disk 11 and the inner top wall surface 24, or dispose a grooved plate 37 between the adjacent magnetic disks, or use a bottom wall 31 defining the inner bottom wall surface. With such an arrangement, air 14 flows inwardly along the magnetic disk surface and enters a shaft 28 through air vent holes 38, and from the inside of the shaft 28 flows outwardly into between the grooved plate 30 and the inner top wall surface 24. In this way, air is re-circulated in the magnetic disk vessel. The groove of the grooved plate 30 or 37 or grooved inner bottom wall surface, may have differing shapes. The numerals 17 and 18, respectively, depict a head actuator and sealed gas. FIG. 4 shows an example of the groove which is a straight groove 21 having an inclination angle θ in the disk rotation direction with respect to the direction 35 of the inner disk periphery. FIG. 5 shows another example of the groove which is a spiral groove 22 with the inclination angle θ thereof varying between outermost 90 degrees and innermost 0 degree. With an increase of the inclination angle θ within 90 degrees the velocity of the inward air flow is increased which reduces the thickness reduction of the liquid lubricant. In the case of the straight groove 21 as shown in FIG. 4, the limit of the inclination angle θ is given as:

$$\theta = \tan^{-1}(Ri/Ro) \qquad (6)$$

where Ri and Ro are the inner and outer radii of the magnetic disk, respectively. Thus, with 3.5, 2.5 and 1.8 inch magnetic disks, the maximum inclination angle θ is 14.0, 17.1 and 14.7 degrees, respectively.

In the spiral groove 22 as shown in FIG. 5 features that the inclination angle θ can be varied widely from 0 to 90 degrees.

Figure 6:
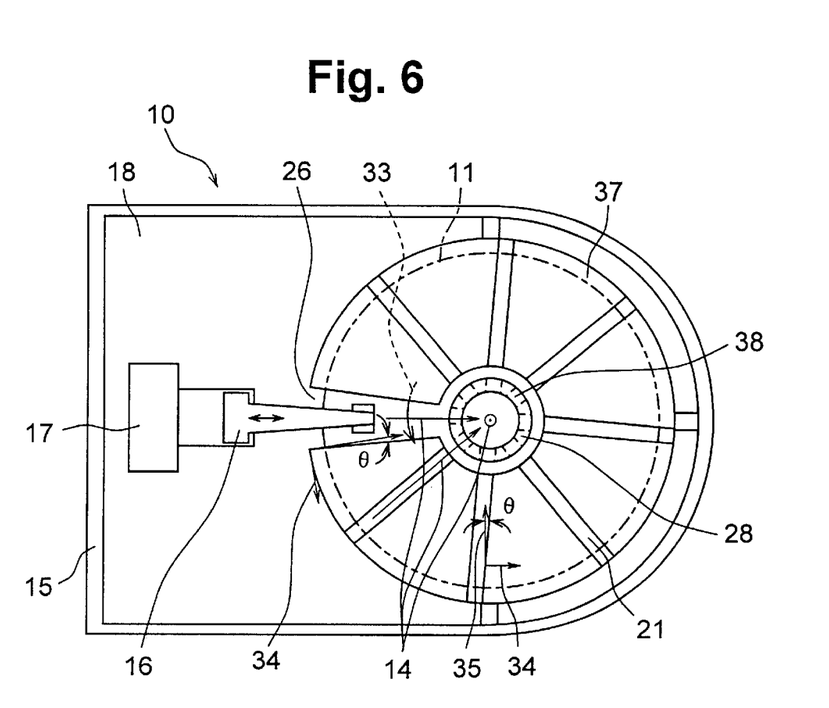
FIG. 6 is a schematic top view showing a further magnetic disk drive using a grooved plate provided over a magnetic disk and with a clearance provided in a portion in which the magnetic head is operable according to the invention.

The groove permits air to flow in the circumferential direction with rotation of the magnetic disk and be directed in the radial direction of the disk. FIG. 6 shows a modification of the grooved plate. In this modification, a notch 26 is provided only in a portion in which the magnetic head 16 is operable. The side of the notch in the direction of rotation 34 of the disk has an inclination angle θ in the direction of disk rotation with respect to the direction of the disk inner periphery. In lieu of the notch, it is possible to reduce the thickness of the groove plate so that the magnetic head will not touch the plate.

Figure 7:
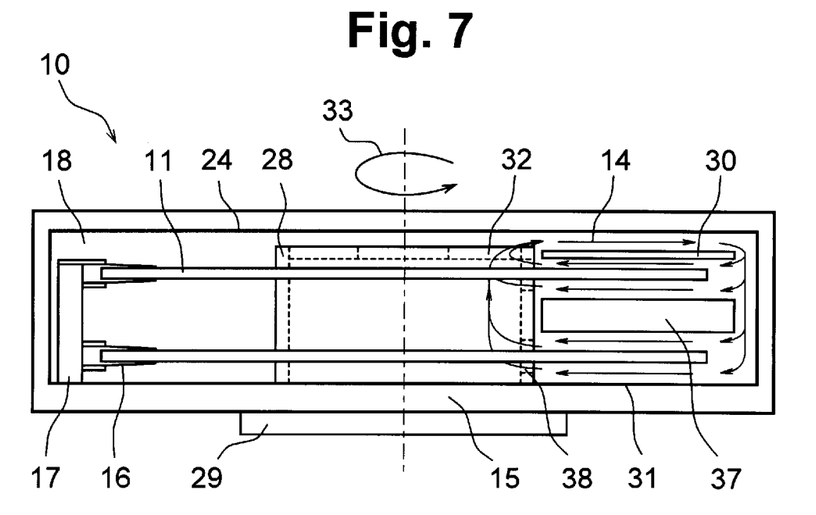
FIG. 7 is a schematic view showing a further magnetic disk drive with a fan provided in a shaft according to the invention.
Figure 8:
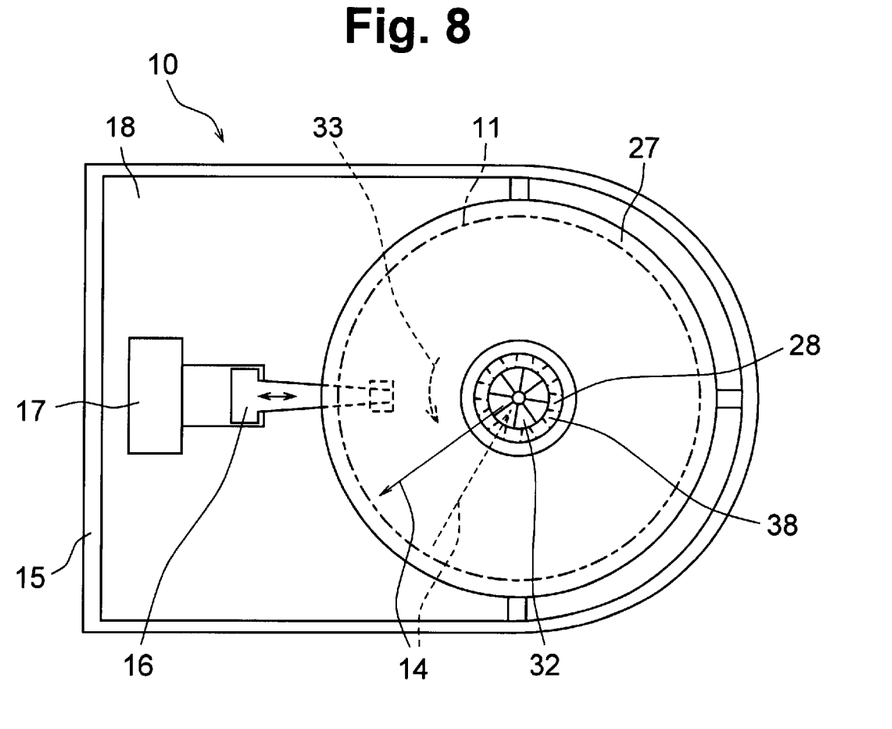
FIG. 8 is a schematic top view showing a further magnetic disk drive using a fan provided in a shaft and also a grooveless plate according to the invention.
Figure 9A:
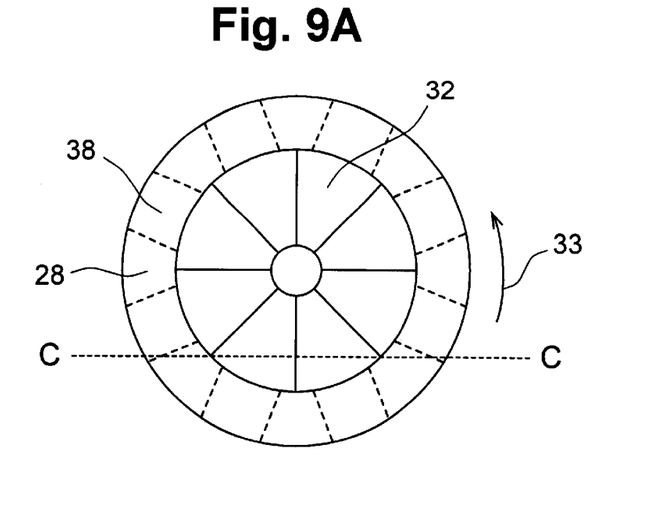
FIGS. 9A to 9C show a shaft and a fan of a further magnetic disk drive according to the invention, FIG. 9A being a plan view, 9B being a side view, FIG. 9C being a sectional view taken along line C—C in FIG. 9A.
Figure 9B:
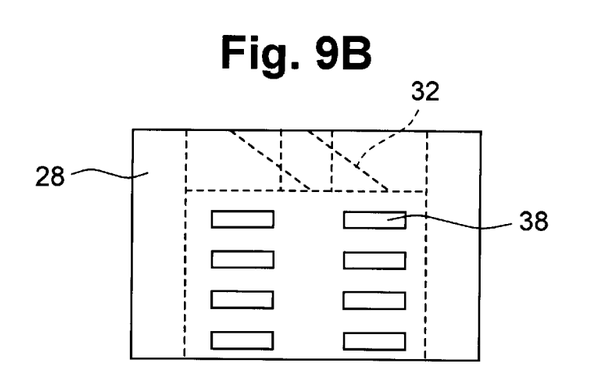
Figure 9C:
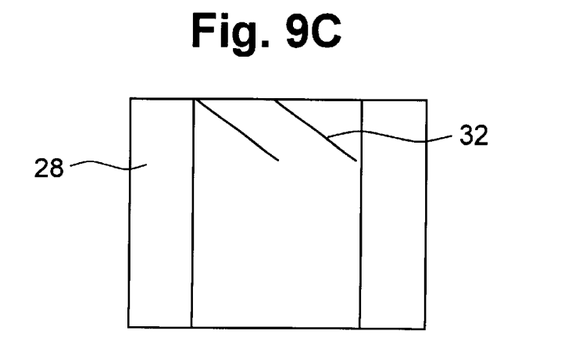

Another method of causing inward air flow is shown in FIGS. 7 and 8. In this case, a fan 32 is provided in a shaft 28. When the magnetic disk is rotated by a motor 29, air is driven out from the shaft inside through the fan 32 to flow through vent holes 38 and along the magnetic disk surface into the shaft 28. Thus, an air flow along the magnetic disk surface is formed, which is directed inwardly of the disk. In this case, the groove of the groove plate 30 or 37 or of the grooved inner bottom wall surface 31 is not necessary, but a combined use may result in a greater amount of air to flow inward. FIG. 8 is a top view of the magnetic disk drive 10, in which a grooveless plate 27 is provided in lieu of the grooved plate 30 shown in FIG. 7 between the magnetic disk 11 and the inner top wall surface 24. In this case, air 14 is caused by the exhausting action of a fan 32 to flow inward between the plate 27 and the magnetic disk 11 and flows through the fan and is exhausted to the outside through the space between the plate 27 and the inner top wall surface 24. The thickness reduction of the liquid lubricant 19 is alleviated by the shearing force of the inward air flow. The alleviating effect can be obtained by the groove of the plate or inner surface, and it can be increased by using a fan. As shown in FIGS. 9A–9C, the fan 32 is secured to the shaft 28. Thus, the shaft 28 and fan 32 are rotated in the direction 33 of rotation of the magnetic disk, thereby causing air in the shaft to be exhausted to the outside. The pressure in the shaft is thus reduced, and this causes air to flow into the shaft through the vent holes 38 and the clearance between adjacent disks, between the magnetic disk and plate, or between the magnetic plate and the inner bottom wall surface as outer space.

Figure 1B:
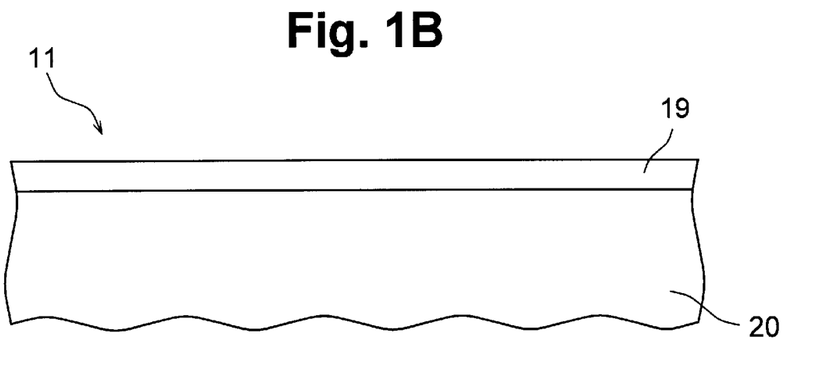
FIG. 1B is a view showing the structure of a magnetic disk.

The magnetic disk 11, as shown in FIG. 1B, has a ground layer 20, which may be a magnetic storing film of a Co alloy or the like or a carbon or SiO$_2$ protective film, and a layer of liquid lubricant 19 covering the layer 20. As for the liquid lubricant 19, perfluoropolyether is used typically in the usual magnetic disk. In the magnetic disk drive according to the invention, any lubricant may be used so long as it is liquid in the working temperature range (usually −10 to 80° C.) of the magnetic disk drive. Examples of the lubricant are silicone oil, hydrocarbon oil, fluorinated hydrocarbon, chlorinated hydrocarbon, fluorinated chlorinated hydrocarbon and functional group denatured derivatives of these compounds.

The invention is now explained using examples as follows.

EXAMPLE 1

Figure 10:
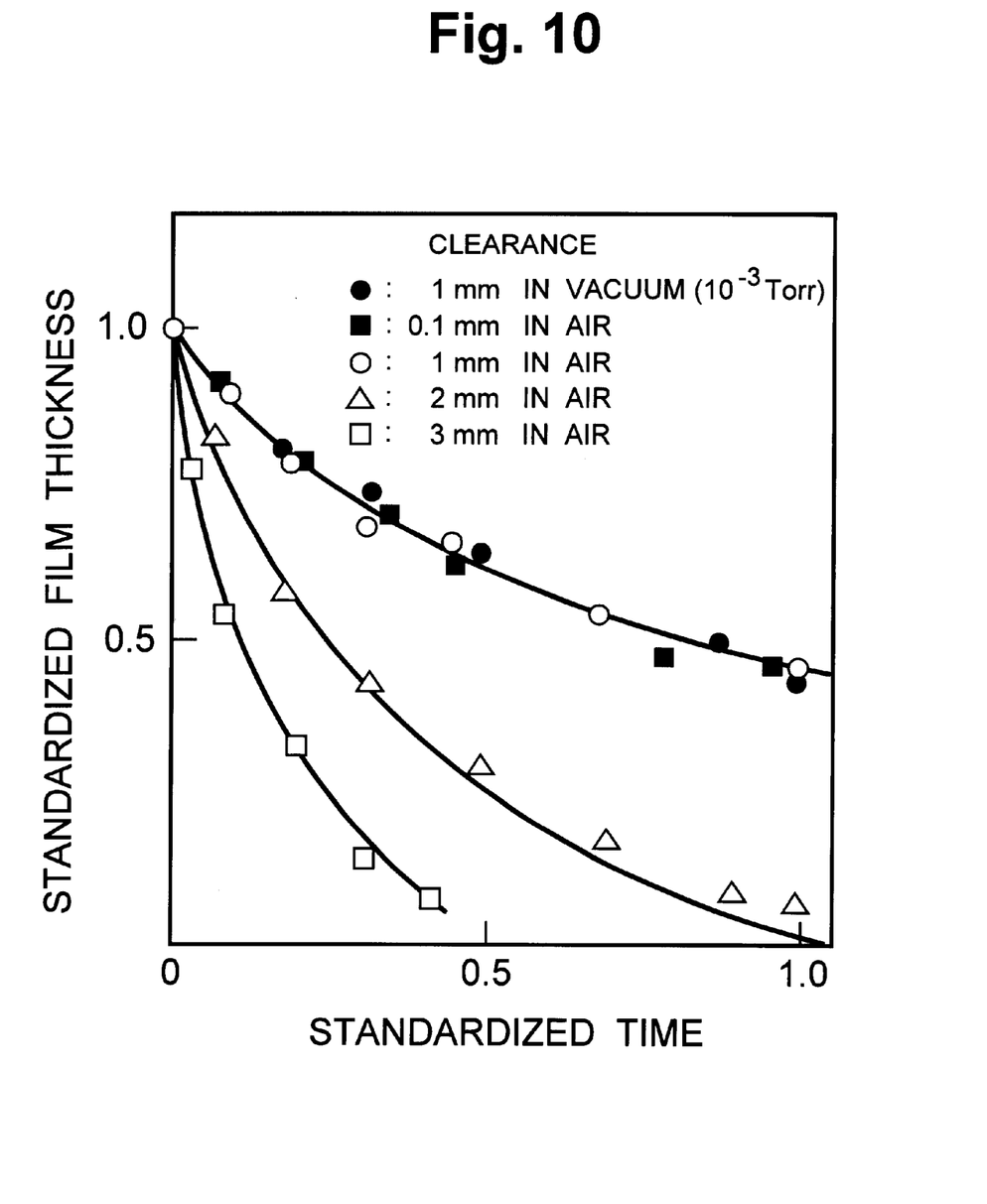
FIG. 10 is a graph showing changes with time of the lubricant thickness due to rotation of the magnetic disk with the clearance between the magnetic disk and opposed surface as a third parameter.

FIG. 10 shows time changes in the lubricant thickness when the magnetic disk was rotated in air at a revolution speed in the range of 1,000 to 10,000 rpm. As lubricant 19 as shown in FIG. 1B, lubricants composed of hydroxyl group denatured PFPE represented by a molecular formula:

and with numerical mean molecular weights of 2,000, 4,000 and 10,000, were each coated on the ground layer 20, consisting of a carbon film formed by the sputtering method, on magnetic disk 11, with the dynamic viscosity set to 0.1, 1, 10, 100, 1,000 and 10,000 cSt by varying the molecular weight or temperature of lubricant and having thicknesses of 0.6, 1.0, 2.0, 5.0, 10.0, 50.0 and 100.0 nm. The lubricant thickness are shown for different values of the clearance 12 or 23 as shown in FIG. 1 as a third parameter. It will be seen from the graph that with clearances of 1 mm and below the thickness reduction trend of the lubricant is the same as that measured in a vacuum of 10$^{-3}$ Torr. It will also be seen that with clearances of 1 mm and above the thickness reduction is accelerated. The standardized time T given as the abscissa axis is expressed as:

$$T = t/(3v_L/H_0^2 s \omega^2) \qquad (7)$$

where t is the test rotation time, $v_L$ is the dynamic viscosity of lubricant, $H_0$ is the initial thickness, and ω is the angular velocity. Denoting the thickness H, the standardized thickness $H_N$ given as the ordinate axis is given as:

$$H_N = H/H_0 \qquad (8)$$

Figure 11:
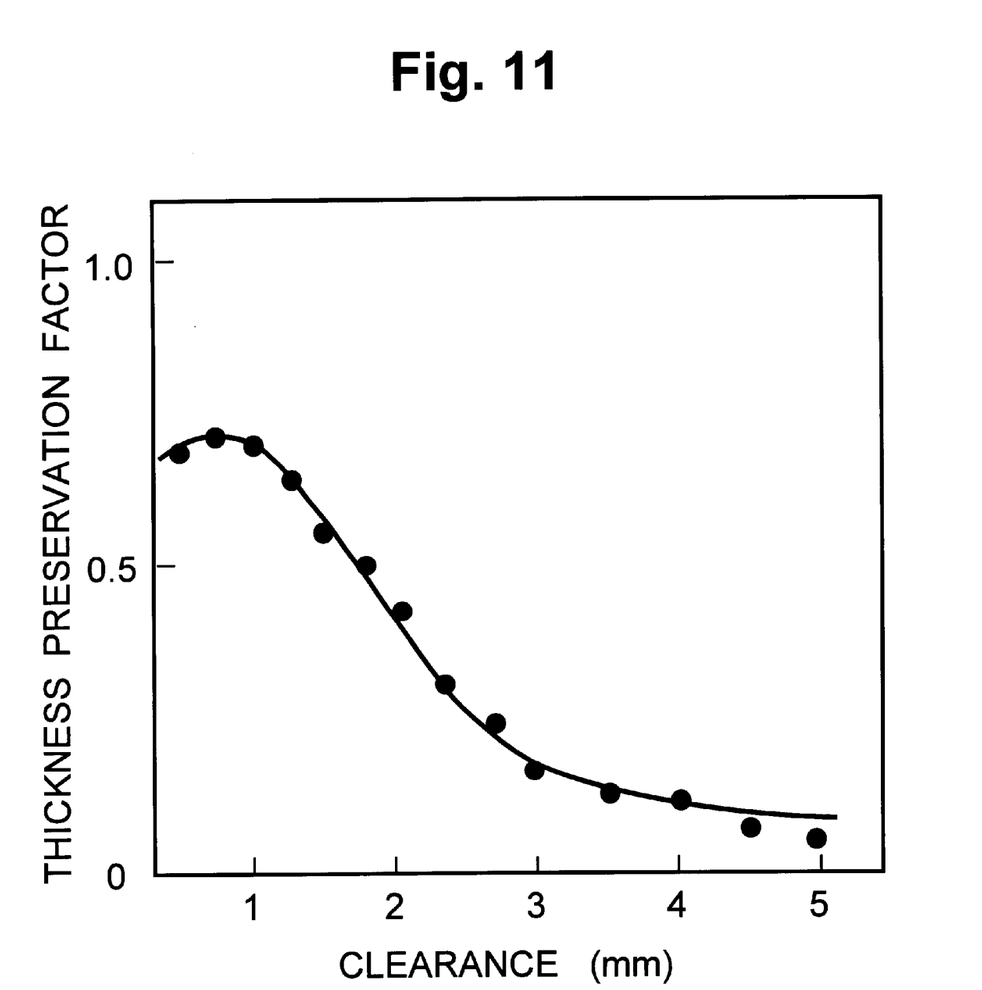
FIG. 11 is a graph showing the relationship between thickness preservation factor of the lubricant film thickness with rotation of the magnetic disk and the clearance between the magnetic disk and opposed surface.

Thus, the viscosity, number of revolutions and thickness of the lubricant are all standardized, and no difference appears in FIG. 10. Further, it will be seen that by selecting the standardized thickness in a standard time of 0.3 (hereinafter referred to as thickness preservation factor) as an index of thickness changes of liquid lubricant with rotation of the magnetic disk, the thickness preservation factor has a maximum value of 0.72 with clearances of 1 mm and below, as shown in FIG. 11.

EXAMPLE 2

The clearance corresponding to the maximum preservation factor was checked by using the various gases shown in the above Table 1 and also mixtures of these gases, and it was in accord with those in Table 1. Further, checks were made by varying the mole mixing ratio of mixtures of the gases shown in Table 1 to 0.2, 0.4, 0.6 and 0.8, and the clearance was in accord with that calculated using the equation (4).

EXAMPLE 3

Figure 12:
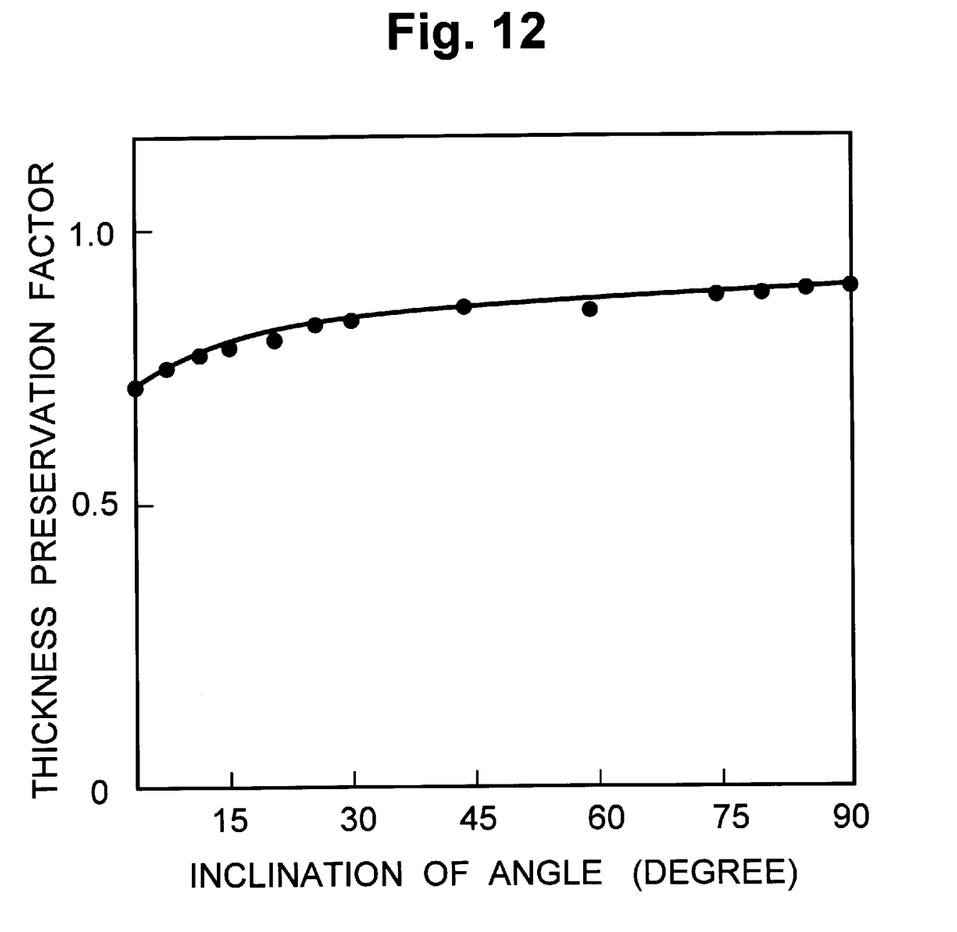
FIG. 12 is a graph showing the relationship between thickness preservation factor of the lubricant film thickness with rotation of a magnetic disk and a groove inclination angle a grooved plate or inner top or bottom wall surface.

The thickness preservation factor of the liquid lubricant was checked by using the magnetic disk drive 10 as shown in FIG. 3, including the grooved plates 30 and 37 and the vent holes 38, and it was found that compared to the magnetic disk drive shown in FIG. 1, in which the clearance is set to 1 mm or below, the thickness preservation factor was further increased to 0.90 max. The groove of the grooved plates 30 and 37 used in this example was the straight groove 21 shown in FIG. 4 or the spiral groove 22 shown in FIG. 5. The relation between the thickness preservation factor and the inclination angle θ of the groove is shown in FIG. 12. It will be seen that the thickness preservation factor is better the greater the angle θ. The inclination angle θ of the spiral groove shows the value of the outermost part of the grooved plate. With the magnetic disk drive as shown in FIG. 6, in which the clearance is provided in a zone in which the magnetic head is operable, the relation between the thickness preservation factor and the inclination angle θ was the same as in FIG. 12.

EXAMPLE 4

The thickness preservation factor was measured by using the magnetic disk drive 10 as shown in FIG. 7, having the fan 32. It was 1.0, that is, the thickness was not reduced at all.

EXAMPLE 5

With the magnetic disk drive as shown in FIG. 8, in which the fan 32 and grooveless plate 27 are combined, the thickness preservation factor was 0.85, indicating the effect of the fan 32.

As shown above, in air the thickness reduction of lubricant due to rotation of the magnetic disk can be minimized by setting the clearance between the magnetic disk and an opposed surface, for instance between adjacent magnetic disks, between a magnetic disk and a plate, or between a magnetic disk and an inner top or bottom wall surface, to 1 mm or below. It was further found that it is possible to increase the clearance corresponding to the minimum thickness reduction where the gas sealed in the magnetic disk drive is helium, xenon, argon, krypton, neon and mixtures of these gases. Further, it was possible to reduce the thickness reduction by providing the plate or inner top or bottom wall surface with a groove having an inclination angle ranging from 0 to 90 degrees. Further, the thickness reduction could be further reduced by providing a fan in the shaft.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A magnetic disk drive comprising at least two magnetic disks mounted on a shaft and arranged for rotation with said shaft, a liquid lubricant covering top and bottom surfaces of said magnetic disks, a magnetic head associated with each said magnetic disk for writing and reading data on each said magnetic disk, a vessel in which the magnetic disks and magnetic heads are hermetically sealed, the vessel having inner top and bottom wall surfaces, said vessel being filled with a gas selected from the group consisting of air, an inert gas, and a mixture thereof, and clearance distances between adjacent magnetic disks and between the magnetic disks and surfaces opposite to said magnetic disks oriented parallel thereto when the magnetic disks are operatively rotating being equal to:

$$\sum_{n}^{n} t_n \times m_n (\text{unit mm}),$$

wherein $m_n$ is the mole percentage of gas n and $t_n$ is a clearance coefficient of the gas n, with t being not larger than 1.0 for air, 1.1 for helium, 1.7 for neon, 1.2 for argon, 1.4 for krypton, and 1.2 for xenon, wherein said clearance distances between adjacent magnetic disks and between the magnetic disks and said surfaces opposite to said magnetic disks are greater than 0.1 mm and less than or equal to 1 mm such that the associated magnetic heads do not touch the magnetic disks and the flow of gas in a radially outward direction of the magnetic disks is prevented, and scattering of said liquid lubricant is minimized, and wherein clearance distances between adjacent magnetic disks is greater than clearance distances between the magnetic disks and said vessel inner top and bottom wall surfaces.

2. The magnetic disk drive according to claim 1, and including an air flow means for inwardly directing air between said magnetic disks and said surfaces opposite to said magnetic disks.

3. The magnetic disk drive according to claim 2, in which said air flow means comprises a plurality of grooves which are provided on a stationary surface opposing at least one of said magnetic disk and which have an inclination angle having a value greater than 0 degrees but less than or equal to 90 degrees in the direction of rotation of the magnetic disks with respect to the direction of an inner periphery of the disks.

4. The magnetic disk drive according to claim 3, in which each of said grooves is a straight groove.

5. The magnetic disk drive according to claim 3, in which each of said grooves is a spiral groove.

6. The magnetic disk drive according to claim 2, in which said air flow means comprises a fan in a said shaft of the magnetic disks.

7. The magnetic disk drive according to claim 1, wherein said inert gas is selected from the following group consisting of helium, neon, argon, krypton and xenon.

\* \* \* \* \*